United States Patent
Fujimura et al.

(10) Patent No.: US 7,836,323 B2
(45) Date of Patent: Nov. 16, 2010

(54) CLOCK REGENERATION CIRCUIT

(75) Inventors: Kensuke Fujimura, Osaka (JP); Naoki Tanahashi, Osaka (JP)

(73) Assignee: Sanyo Electric Co., Ltd. (JP)

( * ) Notice: Subject to any disclaimer, the term of this patent is extended or adjusted under 35 U.S.C. 154(b) by 584 days.

(21) Appl. No.: 11/924,998

(22) Filed: Oct. 26, 2007

(65) Prior Publication Data
US 2008/0100359 A1 May 1, 2008

(30) Foreign Application Priority Data
Oct. 26, 2006 (JP) .............................. 2006-290910

(51) Int. Cl.
*G01D 1/00* (2006.01)
(52) U.S. Cl. ........................... 713/400; 713/1; 375/354; 375/356; 358/1.9
(58) Field of Classification Search .................... 713/1, 713/400; 375/354, 356; 358/1.9
See application file for complete search history.

(56) References Cited

U.S. PATENT DOCUMENTS

| | | | |
|---|---|---|---|
| 6,441,847 B1 * | 8/2002 | Link et al. .................. 348/180 |
| 6,718,476 B1 * | 4/2004 | Shima ......................... 713/400 |
| 7,483,173 B2 * | 1/2009 | Sadowara .................... 358/1.9 |
| 7,542,371 B2 * | 6/2009 | Huang ...................... 365/233.1 |
| 2005/0226359 A1 * | 10/2005 | Uehara ......................... 377/20 |
| 2006/0203266 A1 * | 9/2006 | Sadowara .................... 358/1.9 |
| 2007/0047374 A1 * | 3/2007 | Huang ......................... 365/233 |

FOREIGN PATENT DOCUMENTS

JP    11-225136    8/1999

* cited by examiner

*Primary Examiner*—Abdelmoniem Elamin
(74) *Attorney, Agent, or Firm*—Cantor Colburn LLP

(57) ABSTRACT

There is disclosed a clock regeneration circuit having a PCR buffer including a register which buffers a PCR extracted from a transmission signal, a counter which counts a reception side reference clock CKr, an STC buffer including a register which buffers a counted value of the counter, and a CPU which generates a signal indicating a difference between a transmission side reference clock and the reception side reference clock CKr based on values held in the PCR buffer and the STC buffer. If, at this point, a new PCR is input before the values held in the PCR buffer and the STC buffer are read by the CPU, the PCR buffer and the STC buffer are not updated.

4 Claims, 3 Drawing Sheets

CLOCK REGENERATION CIRCUIT

CROSS-REFERENCE TO RELATED APPLICATION

This application claims priority to Japanese Patent Application No. 2006-290910, filed on Oct. 26, 2006.

BACKGROUND OF THE INVENTION

1. Field of the Invention

The present invention relates to a clock regeneration circuit for use in a reception device of digital communication.

2. Description of the Related Art

In communication such as television and the like, a method is commonly employed in which image data and voice data are compressed using a coding system, such as one which complies to Moving Picture Expert Group (MPEG) standards or the like, prior to being transmitted.

In communication using such a coding system, the image data and the voice data of an image signal are separately coded and compressed in a transmission device to make data stream. Furthermore, the compressed and coded data streams are subjected to time division multiplexing to form packets, and it is the data packets which are then transmitted. At the other end, upon receiving the packets, a reception device extracts the data from each packet, and subjects the data to extension and decoding processing to obtain the original image and voice data.

At this point, during the decoding processing, the decoding must be performed based on and in conformity to a time reference at the time when the encoding processing was performed in the transmission device. Therefore, the reception device must synchronize a reference clock of the decoding processing section with that of the encoding processing section of the transmission device. For this synchronization processing, for example, in an MPEG2 system, a program clock reference (PCR) is included in each packet, as synchronizing information for calibrating a value of a system time clock (STC) as a time reference in the decoding processing section of the reception device in accordance with a time reference in the encoding processing section of the transmission device. This PCR is represented by a counted value of the reference clock of the transmission device.

The reception device includes a phase lock loop (PLL) circuit for generating the STC of a frequency in response to a control signal in order to calibrate the STC based on the PCR, and a counter which counts the STC generated by the PLL to obtain the counted value at a time when the PCR is received. A control section of the reception device obtains an error of the counted value of the STC with respect to the PCR, and controls a clock oscillation circuit so as to reduce error occurrences.

The reception device may be additionally provided with peripheral functions, such as that of transferring data to a memory buffer. The frequency of the reference clock of the control section (CPU) of the reception device is often increased to enable high speed control of such a peripheral function.

Commonly, the frequency of writing in a register which buffers a value of the PCR and a register which buffers a counted value of a STR do not agree with the reference clock of the control section (the CPU) of the reception device which reads the data from the registers. As a bit width of a bus of the control section of the reception device is usually 8 or 16 bits, when readout processing is performed based on the frequency of the reference clock of the control section of the reception device, a readout operation must be performed plural times (12 or 6 times) to read the value of the PCR and the counted value of the STC from the registers.

At this point, when the processing of the control section of the reception device is delayed for some reason while the value of the PCR and the counted value of the STC are being read, the next PCR is received and a problem results that the value buffered in the register is disadvantageously updated with a new value of the PCR and a new counted value of the STC, with the result that correct processing cannot be performed. In an attempt to address this problem, a method has been proposed in which a memory capacity of the register is increased to hold a plurality of values of PCRs and counted values of STCs so that the values are not updated during the processing. However, there is a problem that increasing the memory size of the register causes the overall chip size of the reception device to increase.

SUMMARY OF THE INVENTION

According to the present invention, there is provided a clock regeneration circuit which regenerates a reception side reference clock corresponding to a transmission side reference clock used in generation processing of a transmission signal, wherein the clock regeneration circuit is characterized by including a first buffer which buffers regeneration reference synchronous information extracted from the transmission signal, a counter which counts the reception side reference clock generated based on a clock control signal, a second buffer including a register which buffers a counted value of the counter and which has a predetermined bit width, and a clock control circuit which obtains a difference between the transmission side reference clock and the reception side reference clock based on values held in the first buffer and the second buffer to generate the clock control signal, and wherein, when new regeneration reference synchronous information extracted from the transmission signal is input before the values held in the first buffer and the second buffer are read by the clock control circuit, the first buffer and the second buffer are not updated, and when the new regeneration reference synchronous information extracted from the transmission signal is input after the values held in the first buffer and the second buffer have been read by the clock control circuit, the first buffer and the second buffer are updated.

BRIEF DESCRIPTION OF THE DRAWINGS

An exemplary embodiment of the present invention will be described in detail on the following figures, wherein.

DESCRIPTION OF THE PREFERRED EMBODIMENT

[Device Constitution]

Figure 1:
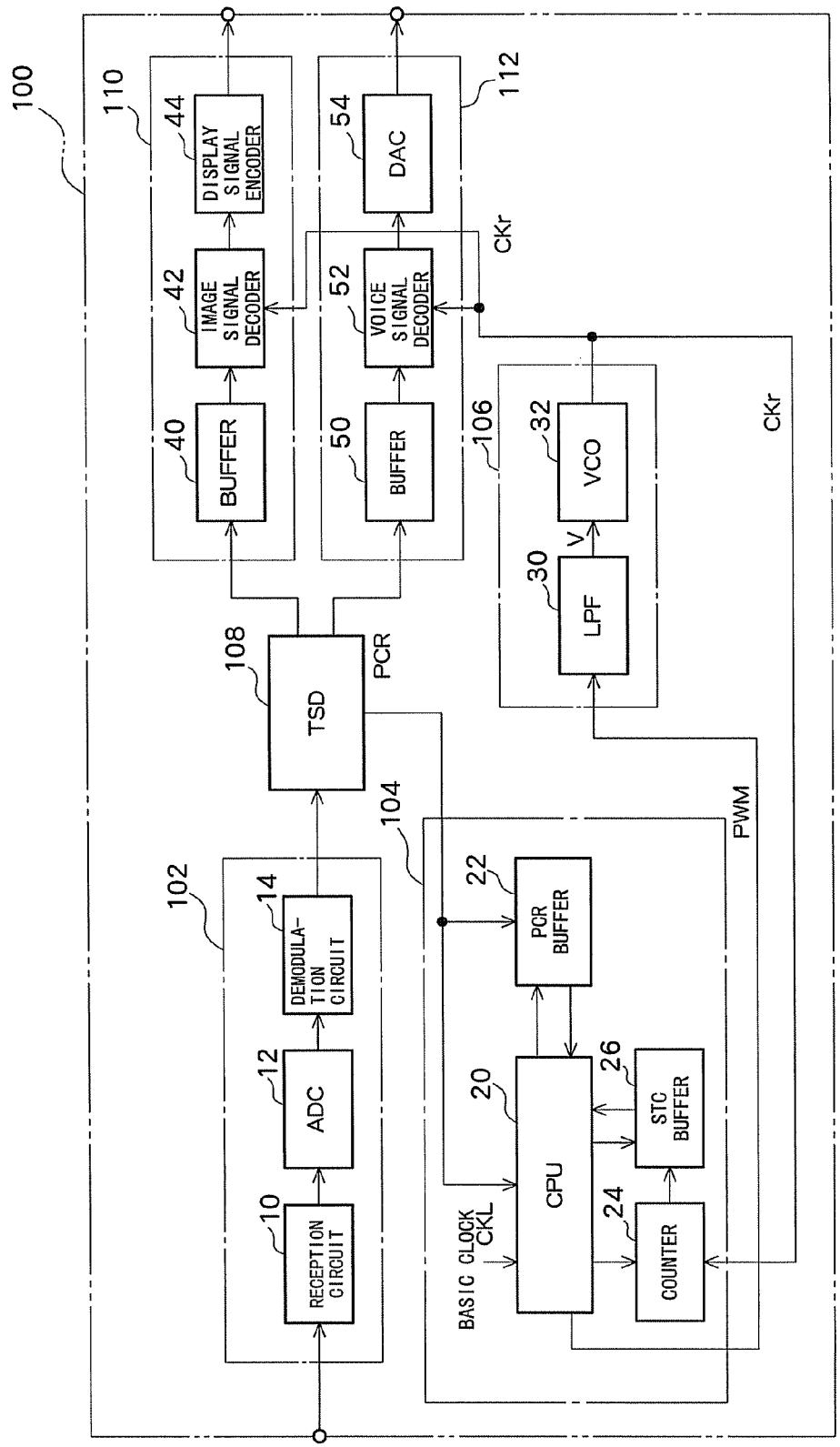
FIG. 1 is a diagram showing a constitution of a reception device according to an embodiment of the present invention.

As shown in FIG. 1, a reception device 100 according to an embodiment of the present invention includes a tuner circuit 102, a clock regeneration circuit 104, a clock oscillation circuit 106, a transport stream decoder circuit (TSD) 108, an image signal processing circuit 110 and a voice signal processing circuit 112.

The reception device 100 receives packets coming as continuous bit strings, accumulates the received packets in a buffer, detects synchronous bits as identification information from the respective packets, separates image data and voice data for each program from the packets based on the identification information, and decodes the respective data to regenerate image signals and voice signals.

The tuner circuit 102 includes a reception circuit 10, an analog-digital conversion circuit (ADC) 12 and a demodulation circuit 14. The reception circuit 10 includes a resonance circuit and the like, and receives a transmission wave transmitted from a transmission device (not shown). The received signal is sent to the ADC 12. The ADC 12 analog-digital converts the signal to transfer the converted signal to the demodulation circuit 14. The demodulation circuit 14 demodulates the converted digital signal according to a predetermined system to generate a transport stream packet (TS packet). Example modulation systems include the VSB and QAM systems. A transport stream including the plurality of demodulated TS packets is sent to the TSD 108.

The TSD 108 separates and extracts image data and voice data from the transport stream. The image data is transmitted to the image signal processing circuit 110. The voice data is transmitted to the voice signal processing circuit 112.

Moreover, the TSD 108 analyzes an adaptation field of the TS packet extracted from the transport stream based on header information (PID) included in the TS packet to detect a program clock reference (PCR). The PCR is a signal indicating a frequency of a transmission side reference clock CKo as a reference in a case where the signal is modulated in the transmission device. The PCR is used as synchronous information for calibrating a reception side reference clock CKr in the reception device 100 in order to perform processing such as demodulation in accordance with the transmission side reference clock CKo in the reception device 100. The extracted PCR is transmitted to the clock regeneration circuit 104.

The clock regeneration circuit 104 includes a CPU 20, a PCR buffer 22, a counter 24 and an STC buffer 26.

The PCR buffer 22 is a register which temporarily stores and holds a value of the received PCR. According to the standard of MPEG2, a bit width of the PCR is defined as 6 bytes (48 bits) including an invalid bit, and of these bits, the actual data indicating the reference clock is constituted of 42 bits. Because the reference clock used by the transmission and reception device is approximately 27 MHz, this reference clock is set to a bit width which can be represented in a range of 24 hours. The PCR is inserted into the packet for each program, for example, at intervals of 0.1 second, and transmitted.

The PCR buffer 22 includes three registers each having 16 bits in accordance with the bit width (42 bits) of an actual data section of the PCR. The PCR buffer 22 receives a holding signal input from the CPU 20, and when the buffer receives a new PCR while the holding signal is indicates enable, the buffer is updated with a value of the PCR.

Upon receiving a count start signal from the CPU 20, the counter 24 begins counting reception side reference clock CKr pulses input from the clock oscillation circuit 106. When the counter 24 receives the holding signal input from the CPU 20 and receives a buffer update signal from the CPU 20 while the holding signal is an enabling signal as shown in a timing chart of FIG. 3, the STC buffer 26 is updated with a counted value. The STC buffer 26 includes a register having a bit width of 42 bits in the same manner as in the PCR buffer 22.

The CPU 20 acquires a PCR value and a counted value of the STC held in the PCR buffer 22 and the STC buffer 26, obtains a difference between the PCR value and the counted value, generates a pulse width modulation signal (the PWM signal) having a pulse width corresponding to the difference, and outputs the signal to the clock oscillation circuit 106. That is, the CPU 20 accomplishes a function of a phase detector circuit (the PD circuit) with respect to the clock oscillation circuit 106.

Moreover, the CPU 20 receives the PCR from the TSD 108 or the like to generate the holding signal and the buffer update signal to be output to the respective sections in the clock regeneration circuit 104. The CPU 20 controls the timing of processing in the clock regeneration circuit 104 using these control signals. The CPU 20 operates based on a basic clock CKL. The basic clock CKL can be generated using a PLL circuit (not shown) based on, for example, the reception side reference clock CKr.

The clock oscillation circuit 106 includes a low pass filter (LPF) 30 and a voltage controlled oscillator (VCO) 32.

The LPF 30 receives the PWM signal from the CPU 20 to smoothen the signal into a direct-current voltage V having a voltage value corresponding to the pulse width of the PWM signal. The direct-current voltage is output to the VCO 32. The VCO 32 receives the direct-current voltage V from the LPF 30 to oscillate the reception side reference clock CKr having a frequency which is proportional to the direct-current voltage V. The reception side reference clock CKr is output to the counter 24 of the clock regeneration circuit 104, the image signal processing circuit 110 and the voice signal processing circuit 112.

The image signal processing circuit 110 includes a buffer 40, an image signal decoder 42, and a display signal encoder 44. The buffer 40 is a buffering memory of FIFO type. The buffer 40 receives the image data from the TSD 108 to successively store and hold the image data in a memory. When the image data held in the buffer 40 is read by the image signal decoder 42, the data is deleted. The image signal decoder 42 receives the reception side reference clock CKr from the clock oscillation circuit 106, and successively reads the image data from the buffer 40 in synchronization with the reception side reference clock CKr to decode the data into an original image signal. The decoded image signal is output to the display signal encoder 44. The display signal encoder 44 converts the decoded image signal into a signal system which can be displayed in a display in response to the display connected to the reception device 100, and outputs the converted signal.

The voice signal processing circuit 112 includes a buffer 50, a voice signal decoder 52 and a digital-analog converter (DAC) 54. The buffer 50 is a FIFO buffering memory. The buffer 50 receives the voice data from the TSD 108 to successively store and hold the voice data in a memory. After the voice data held in the buffer 50 has been read by the voice signal decoder 52, the data is deleted. The voice signal decoder 52 receives the reception side reference clock CKr from the clock oscillation circuit 106, and successively reads the voice data from the buffer 50 in synchronization with the reception side reference clock CKr to decode the data into an original voice signal. The decoded voice signal is output to the DAC 54. The DAC 54 digital-analog converts the decoded voice signal to output the converted signal.

It is to be noted that when the voice signal is constituted of a plurality of channels (CH), the voice signal processing circuit 112 may be provided with a plurality of buffers 50, voice signal decoders 52 and digital/analog converters (DACs) 54 so that the channels can individually be processed.

[Processing]

Figure 2:
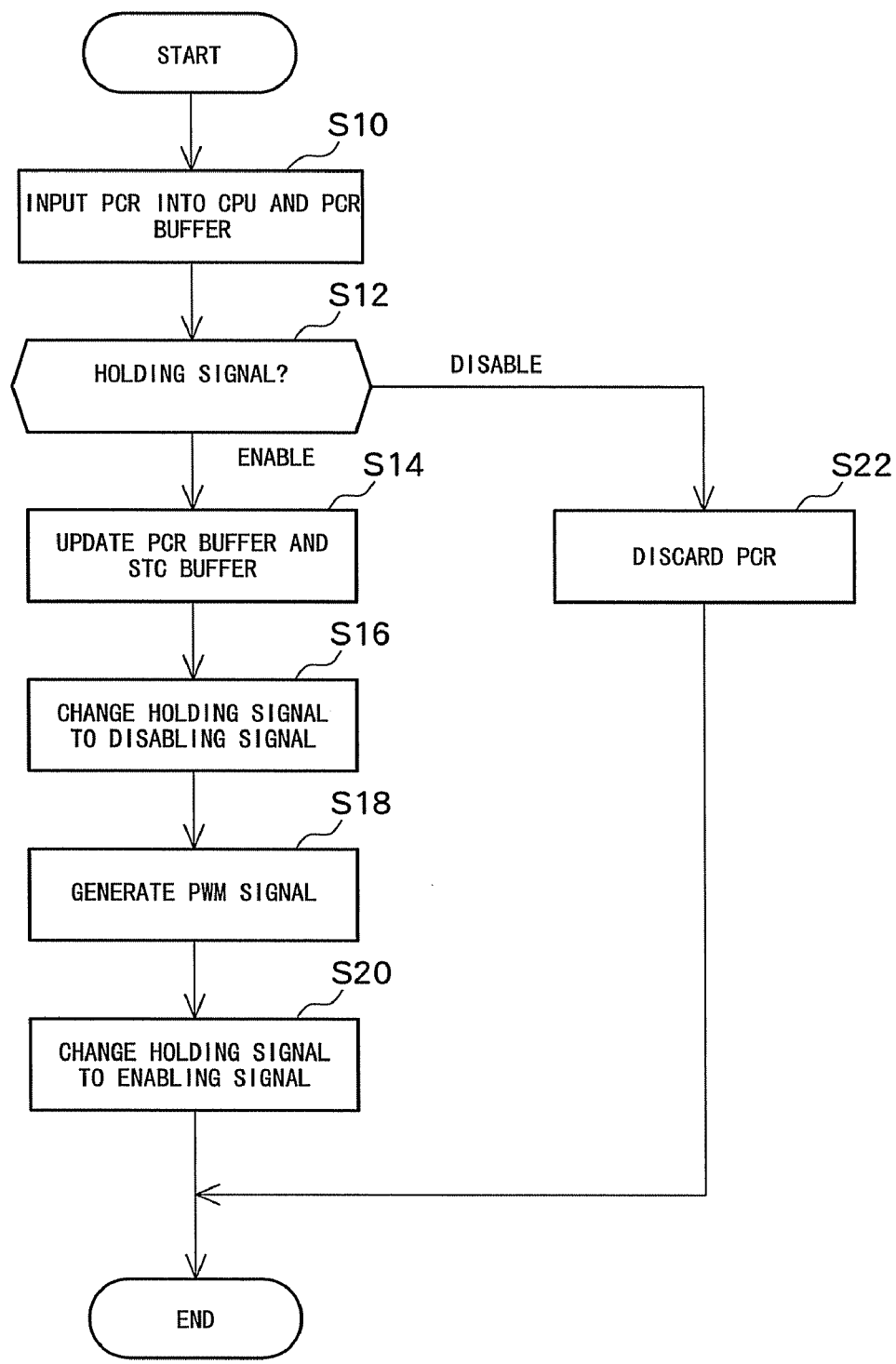
FIG. 2 is a flowchart of clock regeneration processing according to the embodiment of the present invention.
Figure 3:
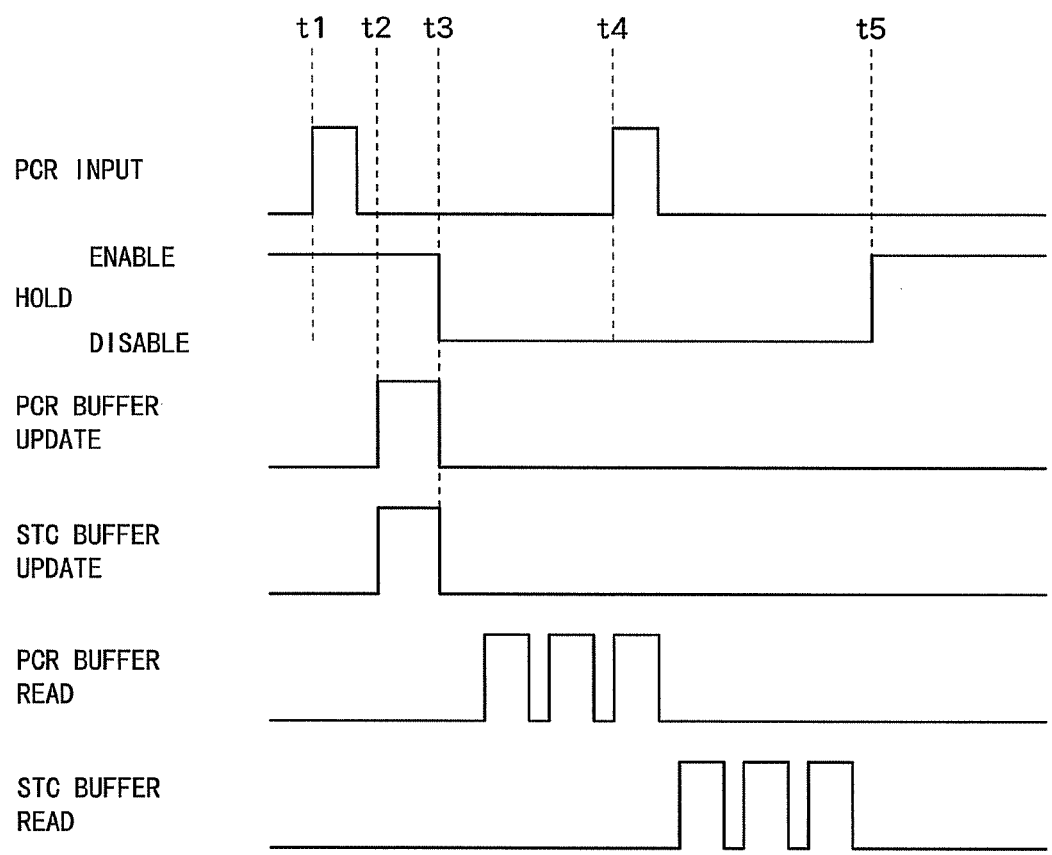
FIG. 3 is a timing chart of the clock regeneration processing according to the embodiment of the present invention.

Next, processing in the clock regeneration circuit 104 will be described with reference to a flowchart of FIG. 2 and a timing chart of FIG. 3.

At step S10, the PCR extracted from the TS packet in the TSD 108 is input into the CPU 20 and the PCR buffer 22. In consequence, interruption to the CPU 20 is generated, and processing subsequent to step S12 is started.

In the step S12, it is judged whether or not the holding signal communicates "enable" or "disable". As at time t1 of FIG. 3, if the holding signal is at enable at a time when the CPU 20 receives the PCR, the CPU shifts the processing to step S14. On the other hand, as at a time t5 of FIG. 3, if the holding signal is at disable at a time when the CPU 20 receives the PCR, the CPU shifts the processing to step S22.

At step S14, the PCR buffer 22 and the STC buffer 26 are updated. As shown at time t2 of FIG. 3, the CPU 20 outputs the buffer update signals to the PCR buffer 22 and the STC buffer 26.

When receiving the buffer update signal, the PCR buffer 22 updates a buffering memory with the value of the PCR newly received in the step S10, if the holding signal is an enable signal. Since the actual data of the PCR is constituted of 42 bits, all the registers of 16 bits×3 banks of the PCR buffer 22 are updated. After the completion of the update processing of the registers, the PCR buffer 22 outputs an interruption signal to the CPU 20.

Moreover, when receiving the buffer update signal, the STC buffer 26 updates the buffering memory with the present value of the counter 24, if the holding signal is an enable signal. At this time, the counter 24 also updates all the registers of 16 bits×3 banks of the STC buffer 26, as described later. After the completion of the update processing of the registers, the STC buffer 26 outputs an interruption signal to the CPU 20.

At step S16, the holding signal is changed to the disable state. When the CPU 20 receives the interruption signals indicating the update completion of contents of the registers from the PCR buffer 22 and the STC buffer 26, the CPU 20 changes the holding signal to the disable state, as shown at time t3 of FIG. 3.

Furthermore, the CPU 20 outputs a reset signal to the counter 24. In consequence, the value of the counter 24 is reset, and the counter 24 newly starts counting the reception side reference clock CKr input from the clock oscillation circuit 106.

At step S18, the PWM signal is generated and output based on the PCR value and on the counted value held in the PCR buffer 22 and the STC buffer 26.

The CPU 20 successively reads the PCR value held in the PCR buffer 22. At this time, a bit width of a bus of the CPU 20 is usually 8 or 16 bits. Therefore, when readout processing is performed based on a frequency of the basic clock CKL of the CPU 20 of the reception device, the PCR value is read from the register of the PCR buffer 22 of a 42-bit width every 8 or 16 bits six or three times in a divisional manner. Furthermore, the CPU 20 successively reads the counted values held in the STC buffer 26. Also at this time, the bus width of the CPU 20 is 8 or 16 bits, and hence the counted value is read from the register of the STC buffer 26 of a 42-bit width every 8 or 16 bits six times or three times in a divisional manner.

The CPU 20 calculates a difference between the read PCR value and the read counted value in order to generate a PWM signal having a pulse width regulated in accordance with the difference. Specifically, the pulse width of the generated PWM signal is equal that the pulse width of the PWM signal then being output, reduced by a value corresponding to (the counted value—the PCR value). In consequence, when the counted value is larger than the PCR value, a PWM signal is generated in which the pulse width is reduced by a value corresponding to this difference. On the other hand, when the PCR value is larger than the counted value, the PWM signal is generated in which the pulse width is enlarged as much as the pulse width corresponding to the difference. The generated PWM signal is input into the LPF of the clock oscillation circuit 106.

In this way, the pulse width of the PWM signal is regulated based on the difference between the read PCR value and the counted value, whereby the frequency of the reception side reference clock CKr is regulated in accordance with the pulse width of the PWM signal in the clock oscillation circuit 106. In consequence, the reception side reference clock CKr can be regenerated in conformity to the transmission side reference clock CKo.

In a step S20, the holding signal is changed to the enable state. When the generation processing of the PWM signal is completed, the CPU 20 changes the holding signal to the enable state as shown at the time t5 of FIG. 3.

At step S22, the received PCR is discarded. For example, as shown at time t4 of FIG. 3, when the CPU 20 receives the PCR in a case where the holding signal is at disable, the CPU does not output the buffer update signal to the PCR buffer 22. In consequence, the PCR newly received at step S10 is discarded. Under normal circumstances, the PCR is not discarded, but situations may occur when the processing speed of the CPU 20 drops for a certain cause.

Moreover, the CPU 20 outputs the reset signal to the counter 24. In consequence, the value of the counter 24 is reset, and the counter 24 freshly restarts the count of the reception side reference clock CKr input from the clock oscillation circuit 106. At this time, it is preferable that the PCR value received immediately before the reset operation is set to the counter 24 and that the count of the reception side reference clock CKr is started from the set value. Therefore, the counted value of the counter 24 can easily be compared with the subsequently received PCR value.

As described above, according to the present embodiment, the holding signal is disabled before the readout processing of the CPU 20 from the PCR buffer and the STC buffer ends, whereby the PCR buffer and the STC buffer can be prevented from being updated with the newly received PCR and counted values. Therefore, clock regeneration processing can reliably be performed without increasing the memory sizes of the registers.

What is claimed is:

1. A clock regeneration circuit comprising:
    a first buffer which buffers regeneration reference synchronous information extracted from a transmission signal;
    a counter which counts a reception side reference clock generated based on a clock control signal;
    a second buffer including a register which buffers a counted value of the counter and which has a predetermined bit width; and
    a clock control circuit which obtains a difference between a transmission side reference clock and the reception side reference clock based on values held in the first buffer and the second buffer to generate the clock control signal,
    wherein when new regeneration reference synchronous information extracted from the transmission signal is input before the values held in the first buffer and the second buffer are read by the clock control circuit, the first buffer and the second buffer are not updated, when the new regeneration reference synchronous information extracted from the transmission signal is input after the values held in the first buffer and the second buffer have been read by the clock control circuit, the first buffer and the second buffer are updated, and the reception side reference clock corresponding to the transmission side reference clock using in generation processing of the transmission signal is generated in digital communication.

2. The clock regeneration circuit according to claim 1, wherein the clock control circuit generates a pulse width modulation signal having a pulse width regulated based on a difference between the values held in the first buffer and the second buffer.

3. The clock regeneration circuit according to claim 2, wherein the clock control circuit is a CPU, and controls the update of the first buffer and the second buffer.

4. The clock regeneration circuit according to claim 1 further comprising:

a clock oscillation circuit which generates the reception side reference clock based on the clock control signal.

* * * * *